G. G. BARRY.
WHEEL.
APPLICATION FILED DEC. 9, 1918.
1,422,167.
Patented July 11, 1922.
2 SHEETS—SHEET 1.
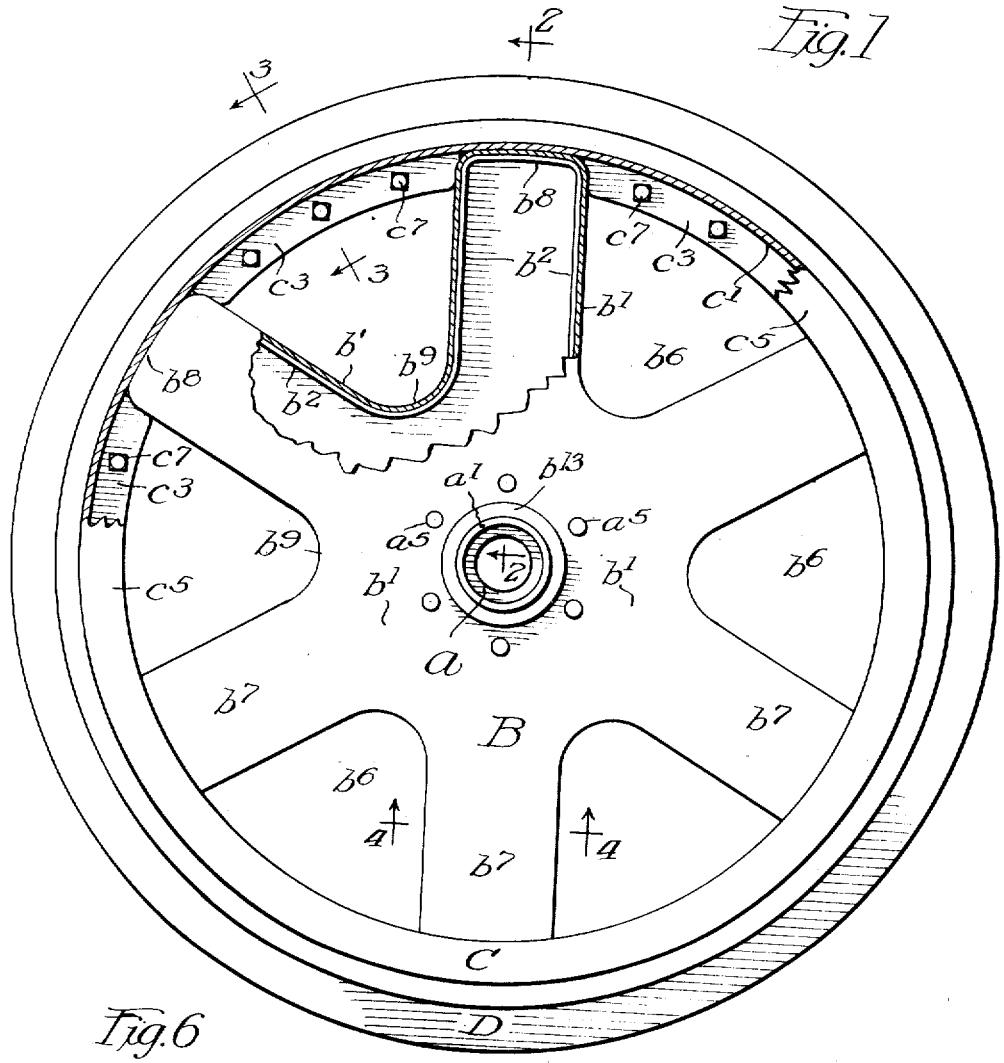
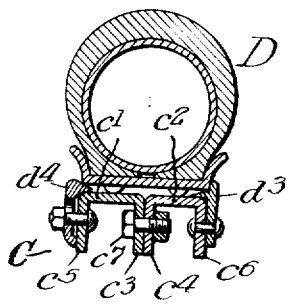
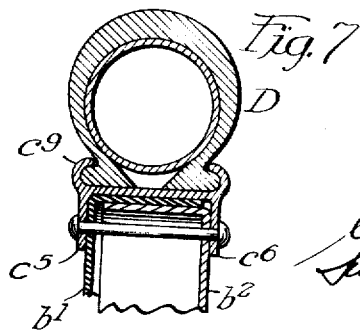

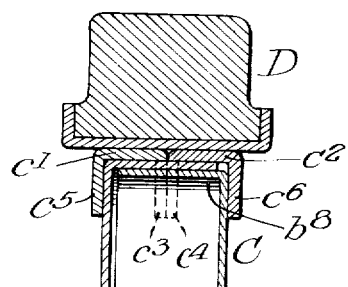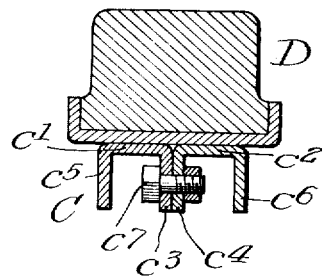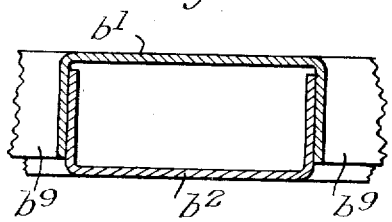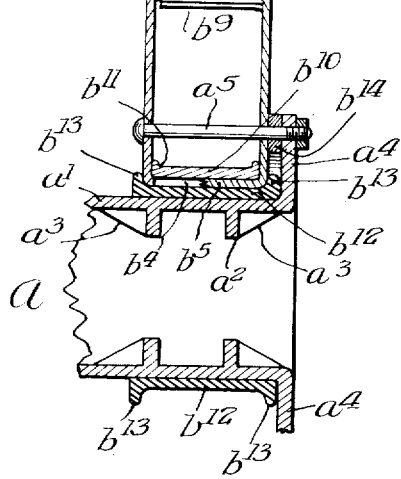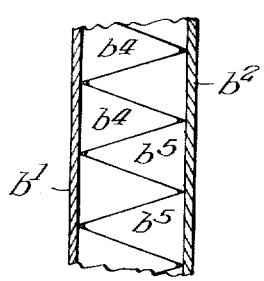

UNITED STATES PATENT OFFICE.

GERALD G. BARRY, OF CHICAGO, ILLINOIS.

WHEEL.

1,422,167.  Specification of Letters Patent.  Patented July 11, 1922.

Application filed December 9, 1918. Serial No. 265,934.

*To all whom it may concern:*

Be it known that I, GERALD G. BARRY, a citizen of the United States, and a resident of Chicago, in the county of Cook and State of Illinois, have invented certain new and useful Improvements in Wheels, of which invention the following is a specification.

This invention was devised primarily for use in connection with automobiles, and is illustrated in that connection. It is adapted however, for advantageous use on a wide variety of other vehicles; also other wheel purposes, such as power pulleys. The object of the invention is to provide a wheel which is light in weight but nevertheless strong and durable, being capable of withstanding severe driving stresses, is simple and cheap to manufacture, and at the same time presents a very rugged and pleasing appearance. The advantages of this new structure when compared with other wheels will be apparent to the manufacturer and user from a consideration of this specification and the accompanying drawings which are made a part thereof.

Referring to the drawings which illustrate the invention embodied in an automobile wheel, Fig. 1 is an outer side elevation of an assembled wheel, with parts broken away, exposing details for explanatory reference; Fig. 2 is a transverse section taken on the line 2—2 of Fig. 1, showing a "pressed on" rubber tire mounting and showing the integral flanges on the two parallel body members, illustrating the telescoping arrangement thereof; Fig. 3 is a section through the peripheral members of the wheel, taken on the line 3—3 of Fig. 1; Fig. 4 is a section through one of the telescoped flanged spoke portions looking toward the hub, being taken on the line marked 4—4 of Fig. 1; Fig. 5 is a plain view of the intermeshing V-shaped flanges on the opposite blanks provided from the respective plates in forming the central hub opening, in this figure the flanges being shown as laid out flat for clearer illustration. Fig. 6 and also Fig. 7 are sections taken through the peripheral members, showing pneumatic tires and different forms of rim mountings therefor in place of the solid tire type chosen for illustration with Figures 1, 2 and 3.

In the description of my invention and in the accompanying drawings, similar letters and marks of reference are used to designate like parts throughout; capital letters are employed in referring to the main wheel elements and in a general way, and the subdivided details of these, or the particular features to be referred to, are indicated by lower case corresponding letters of the alphabet with differentiating numerals.

A designates an ordinary standard form of automobile front wheel hub, in connection with which the new supporting structure is shown assembled. $a^1$ is the main hub body, provided with interior flanges $a^2$ and the ground bearing surfaces $a^3$. $a^4$ marks a flange extending outwardly from and circumferentially around the inner end of the hub body, and to which the supporting body of the wheel is secured by bolts or other suitable fastening means $a^5$. Ordinarily with the common wooden artillery type of wheel there is a further reinforcing clamping plate on the outer side of the wheel, between which plate and the flange $a^4$ the wooden spoke shanks are secured, but with the new sheet metal construction of supporting body of the present invention this may be dispensed with.

It perhaps should be noted here that the new invention is not confined to its being assembled with the particular hub here chosen, but may be mounted on or used with any other suitable hub or shaft. The present invention has to do more particularly with the metal supporting body, element B and the rim element C which may serve directly as the road tire member. Element D, however, is customarily added, this denoting a further rubber road tire member as a part of the complete wheel structure, together with its separate rim and fastening means adapting same for operative mounting on the rim element C. It is to be noticed that the rim element C is not formed integrally with the same blank as the spoke body B, and generally it will be preferable to use a heavier gauge of sheet metal for the rim.

Referring to element B this supporting portion or spoke body structure here shown is formed from a pair of sheet metal blanks, for distinctive reference marked $b^1$ and $b^2$. The original blanks may be of substantially a disc outline, and after the necessary drawing or forming and trimming operations presently referred to, are telescoped together and mounted as a parallel spaced pair of flanged metal plate bodies as shown. A central opening is provided in each side of the body, adapted to receive a suitable hub or shaft fixture. This opening may be formed by cutting the metal blank on a plurality of lines radiating from the center toward the edge of the central opening but leaving the metal unsevered from the blanks around the circumferential edge of the opening. These parts, marked on the blank $b^1$ as $b^4$ and on the opposite blank $b^2$ as $b^5$, are then bent at right angles to their respective main sheet metal body plate, sharp joint edge being avoided, and form integrally therewith a sort of serrated flange around the central opening, and when the two plate sides $b^1$ and $b^2$ are telescoped together, these V-shaped flanges $b^4$ and $b^5$ from the respective plates intermesh, as illustrated in Fig. 5.

The peripheral portion of each blank $b^1$ and $b^2$ has a series of portions drawn out or eliminated circumferentially around the body in the forming operations, there being illustrated in Fig. 1 a series of six such eliminated portions, marked $b^6$, leaving a series of six spoke bar projecting portions, $b^7$, on the plate body. A flange is provided on and integrally with each plate body, following continuously around the outer ends, marked $b^8$, of the spoke bars, the sides thereof and the portion of the metal plate body (which is preferably of the curved outline shown), marked $b^9$, between and uniting adjoining spokes. In providing the open portions $b^6$ from the original blank, the metal is not severed around the outlined border of the main body but in the forming operations will be parted a distance inwardly from the original outer edge of the blank at about the center of each open portion and the metal from these open spaces removed from the otherwise circular form of the body, affords ample material for the forming dies to draw over the flange at the curved portions $b^9$ and the sides of the projecting spokes, and the original blank being, of course, large enough to allow for the portion of the flange at the ends of the spokes. While a separate reference designation has been given to different portions of this flange around the outermost edge of each of the two plate bodies, it will be noticed from the drawings that same forms on the respective blanks but one continuous flange, somewhat undulatory in its progress around the body, drawn substantially at right angles and integrally from the respective body plate blank $b^1$ or $b^2$, as the case may be.

It is important to observe that the undulation of the said outer flanges is not taken inwardly clear to the hub but the curved parts $b^9$ are located about midway, the projecting spoke portions of the plate body being preferably only about one-half of the radial depth of the body. This for reasons of strength and also appearance. Where the flange joins the main body the forming die rounds the point of junction. The forming should be done so there are no cross slits or breaks in the continuous form of the flange in its progress around the body. Avoiding sharp angles at the body junction, providing the rounded corners at the spoke ends and the curved portion of the walls $b^9$ between spokes, adds considerably to the strain resisting capacity of the structure. While I much prefer that the flange be continuous, as described, yet in some instances the end portion $b^8$, or some of it, may be omitted, without departing from the main features of the invention.

It will be observed that this undulating flange on one blank is drawn down so that the body size, including the spoke bar width, etc., is sufficiently smaller than the one on the opposite side that the two sides of the body, $b^1$ and $b^2$, can be telescopically shrunk or forced together, as shown, with one of the undulating flanges directly under or within the other. The drawing here shows the plate body marked $b^2$, on the inside of the wheel structure, to be the smaller of the two and telescoped within the outside member $b^1$, this being preferable for appearance on account of presenting the rounded flange junction edge in view. Of course, the continuous flanges as first drawn over from the body plate will have a rough edge when taken off the forming dies, and will have to be trimmed to provide the proper straight lined edge before being telescoped.

Before the two flanged body plates $b^1$ and $b^2$ are thus telescopically shrunk or pressed together, however, there is positioned at the central opening, encircling the flange, a tightly fitting collar band $b^{10}$, which is preferably provided with an outwardly extending circumferential flange $b^{11}$ on each side thereof, this band being of a width to correspond with the spaced relation of the two parallel plate bodies. The opposite body side is then telescoped into position, and the central opening flanges $b^4$ and $b^5$ will then intermesh within the collar band $b^{10}$. There is preferably then inserted in the central opening a further tightly fitting band or ferrule $b^{12}$, which may be made from a tube somewhat longer than the opening, and the ends thereof then spun, struck over or swedged to form flanges, marked $b^{13}$, on the outside, and tightly secure centrally the two parallel plate bodies $b^1$ and $b^2$ against outward disengagement; and there being a further securing means at the outer rim. The intermeshing flanges $b^4$ and $b^5$ and the flanged spacing collar $b^{10}$ prevent inward yielding or collapsing. The intermeshing fingers of the flanges $b^4$ and $b^5$ being between the two bands, are also thus held against displacement. This combined, very simple central assembly greatly reinforces the main body, as will be readily apparent. It will be obvious, of course, that the central flanges $b^4$ and $b^5$, whether in this preferred V-shaped form or otherwise, may be held simply between the collar $b^{10}$ and the main body of the hub member A; or on some classes of vehicles the simple ferrule band $b^{12}$ may serve directly as the wheel hub. When the new structure is to be mounted on a hub such as here illustrated a flat ring or washer $b^{14}$ may be inserted between the body plate $b^2$ and the hub flange $a^4$, to compensate for any protruding of the ferrule end.

C denotes the rim element. As already noticed, this is not formed integrally with the spoke body B, but separately and preferably of a heavier grade of metal, and the two elements later operatively assembled. The attempts to make a pressed metal wheel heretofore, so far as I am aware, have comprised an integral felly and spoke structure, and generally have called for making from the one blank the hub, spokes and felly or rim members. In my structure, the felly or rim element is preferably, but not necessarily, made in two circumferentially divided parts, marked $c^1$ and $c^2$. These may be made from U-shaped metal channel bands, when rolled into the annular form and positioned the flanges of the channel being hubwardly directed. The inner flanges on each half, marked respectively $c^3$ and $c^4$, are cut to conform to the shape of the ends $b^8$ of the several spokes, so as to permit the two opposite halves of the rim member to be forced from opposite sides over the said flanged ends $b^8$ of the spokes, while the portions of said inner flanges $c^3$ and $c^4$ which remain not cut out (see Fig. 1) extend across as a strong bridge between adjoining spoke abutments and serve with the circumferential flanges on the outside, marked $c^5$ and $c^6$, to brace and reinforce the structure. These two halves of the rim after being suitably positioned over the spoke ends, are then secured together by bolts or otherwise, as indicated at $c^7$. This, it will be noticed, also serves to clamp the outer telescoped spoke ends of the two plate bodies between the outside overhanging rim flanges $c^5$ and $c^6$, and this adds to the already tight manner in which the two flanged plate members are shrunk or pressed together in preventing subsequent disengagement. In Figs. 2, 3 and 6, it will be noticed that the securing bolts and nuts are located with ample head room but protected from being sheared off through striking curbing or other road obstructions. Of course, it will be understood that the rim members may be otherwise secured, for example, by welding; and in Fig. 7, illustrating a different form of rim and tire mounting, long shank round headed rivets are used, the shanks extending from one overhanging flange $c^5$ to the opposite flange $c^6$, passing through both walls of the supporting body directly under the spoke end flanges $b^8$.

The metal rim member C may in some cases be directly employed as the road tire; or it can have any suitable form of road tire operatively mounted thereon. In Figs. 1, 2 and 3, an ordinary solid rubber tire of the "pressed on" type is illustrated with my invention. In Fig. 6 and Fig. 7 other forms of tire mountings are illustrated. Fig. 6 shows a transverse section through a common form of demountable rim with pneumatic tire carried thereby, my rim member $c^1$ $c^2$ being provided on the inside of the wheel with an outwardly projecting holding flange or series of projecting flange heads $d^3$ riveted to the inside rim flange $c^6$, and on the other side a detachable band or fastening means $d^4$. In Fig. 7 a still further modification is illustrated. Here the rim member C instead of being made in the preferred two part form shown in Figures 2, 3 and 6, is in one piece. This is made of I-beam type of metal stock, formed into the necessary annular shape, but having, of course, a parting to permit same being sprung over the spoke ends. Bolts or long rivets, as already mentioned, extending from one overhanging tight fitting flange $c^5$ to the opposite flange $c^6$, are used to fasten this rim. The flanges on the other side of the I-beam stock may be formed into the curved clincher type rim flange, as indicated at $c^9$ for holding a clincher tire. This simple form of tire rim would not be detachable. A clincher non-detachable rim with pneumatic tire is employed on the well known Ford automobile. With my simple structure an entire extra tire mounted body may well be provided and carried in place of the customary spare demountable rim and tire, the whole being readily attached and detached at the hub.

It will be observed from the drawings and the foregoing description that I have invented a structure having features of considerable and growing commercial importance. The supply of proper wood for wheels is becoming scarce, and the material and labor costs are mounting in the manufacture of wood wheels, as well as there being lacking other advantages provided by the present invention. Some cast steel wheels have been used on heavy vehicles, but cast metal having such a low "elastic point" they are liable to crack under the shocks of heavy loads, so that the ordinary cast wheel is altogether too heavy and costly. Wire wheels, while light, are excessive dirt collectors and difficult to keep clean, and the necessary material and adjusting and assembling costs high. Sheet metal disc wheels have many advantages which have recently brought them favorable attention. Wooden wheels are of the compression type, the spokes in the lower half carrying the weight; with wire wheels the upper spokes are under tension and the load on the hub may be said to be carried in suspension by the upper wires; while with a proper rim secured metal disc the load strain on the hub is sustained both by compression and suspension. The per pound capacity of a relatively thin sheet metal plate when placed on edge to withstand enormous load strains is well known. In vehicle wheels, however, the danger of the twisting or lateral strains is an important one to be guarded against, and ordinary disc wheels have been found to "buckle." With the construction in accordance with the present invention, however, the practical conditions, it will be very apparent to the manufacturer and user, have been satisfactorily provided for. The aggregate weight of material in the pair of relatively thin parallel sheet metal body members, formed as herein described, is less than could be safely used in a pair of plain discs or even with a single disc. The single disc wheels are necessarily thicker, and are particularly subject to the risk of distortion under lateral strains. In the present invention the provision of the flanges which are drawn over and formed integrally from the same blank, the location and undulatory and continuous form thereof, and particularly when the two are tightly telecoped together, adds enormously to the capacity to resist "buckling" and all other operating strains. The weight of the whole is less than it would be with a complete disk, as in removing the portions $b^6$ around the periphery of the body the equivalent of the metal in the flanges is provided, while the telescoped flanges provided add greatly to the strengthening of the body and permit a thinner gauge of metal to be used. The forming and assembling operations are very simple and not costly, and the complete wheel presents a very rugged, pleasing appearance, is light, strong, easily cleaned and altogether serviceable.

It will be apparent that various changes may be made in the construction of the vehicle wheels herein chosen for illustration without departing from the spirit and scope of my invention, and I do not wish any undue limitation to result from the detailed description given, but desire the claims appended hereto to be construed as broadly as possible in view of the prior art relating to wheels.

Having described my invention, what I claim as new and desire to secure by Letters Patent is the following:

1. In a vehicle wheel, the combination of a suitable hub, a supporting spoke body between the hub and rim, said supporting body comprising a pair of sheet metal flanged body plate members as herein described telescoped together, each of said sheet metal body members being formed from a blank provided with a central opening adapted to receive a hub, the main body of each said member being provided with a flange around the outer edge thereof, in forming which outer flange each of said metal blanks having a corresponding circumferential series of portions removed therefrom, leaving a series of projecting spoke bars, and the outer flange being formed as an integral continuous one from and following around the main body of each said member as thus formed (including the ends and sides of the projecting spoke bars and connecting portions of the plate body between the spokes), the said outer flange on one of said members being formed so that the body size is such that the corresponding flange on the opposite member may be forced thereover and the said two members telescoped together, the said outer flanges of the two members when telescoped being directed toward each other and being of a width substantially corresponding to the space between the two main body plates, thus providing a double thickness of the metal around the outer telescoped edges of the assembled body, means for securing the telescoped main body plates from disengagement at the central opening, means for securing the said telescoped body to the hub, an annular rim mounted on the spoke ends, and means for securing the said rim member to the spoke ends, substantially as set forth.

2. A wheel, as described in the foregoing claim 1, having the central hub receiving opening so formed on each blank that the metal of the main body is slit from the center toward the edge of the opening and bent inwardly to provide a serrated flange around the said central opening, a spacing collar between the two main body members encircling the central opening, and the said serrated flanges from the opposite plates being arranged to intermesh, substantially as shown and described.

3. In a wheel substantially as herein shown and described, the rim member thereof divided circumferentially into two halves, each half having hubwardly directed flanges on the two edges thereof, the inner flange of the respective rim halves being cut out and shaped to conform to the outline of the flanged spoke ends and adapted to be forced thereover and the outer flanges overhanging the spoke sides, and means for securing the said two rim halves together and clamping the series of spoke ends between the outer overhanging flanges of said rim halves, substantially as shown and described.

4. In a wheel, the combination of a suitable hub, a spoked supporting body between the hub and rim, comprising a pair of flanged metal body plate members telescoped together, each of said metal body members provided with a central opening adapted to receive a hub, the main body of each said member being provided with a flange continuously around the outer edge thereof, each of said metal body members having a circumferential series of portions (corresponding in both plates) removed therefrom at the periphery, leaving a series of projecting spokes, and the outer flange provided being formed as an integral continuous one following around the outer line of the main body of each said member as thus formed, the said outer flange on one of said members being so made that the body size is such that the corresponding flange on the opposite member may be forced thereunder and the said two body members telescoped together, the said outer flanges of the two members being directed toward each other when telescoped and of a width substantially corresponding to the space between the two main body plates, and the outer flanged periphery when telescoped thus comprised of a double thickness of metal, means for maintaining the spaced relation of the two main body members at the central opening, means for securing the said telescoped body to the hub, an annular rim operatively mounted on the spoke ends, and means at the spoke ends for there securing the said telescoped members against disengagement.

5. In a wheel, as a supporting structure operatively positioned between the hub and rim elements, a body comprising a metal plate having a central hub opening and having around the circumferential edge thereof, a series of portions eliminated from the otherwise disc form of the body, substantially as illustrated, and a continuous flange on said body following around the outer edge thereof as so formed, a second correspondingly formed metal plate the size of which, however, is sufficiently smaller so that its outer edge flange may be forced under the flange on the opposite metal plate and the two thus telescoped together.

6. In a vehicle wheel of the character described, a supporting body between the rim and hub elements formed from a corresponding pair of discs, having around the periphery a series of spoke separated portions eliminated from the disc, which portions extend inwardly to points substantially one half of the radial depth of the body, and a continuous flange around the outer edge of the body as so formed.

7. In the metal supporting element between the rim and hub of a wheel of the character described, having a circumferential series of spoke separated portions eliminated from the main circular body but extending only part of the radial depth of said body, a series of spoke bars left remaining having sides offset from but parallel with true radius lines of the said body, the outer corners of the spoke bars being rounded and the remaining wall of said body between and uniting adjoining spoke bars being curved, and a flange integrally with the said body as so formed following around the outermost edge thereof, substantially as set forth.

8. In a wheel, a spoke supporting body not formed integrally with but operatively positioned between the hub and rim elements, said spoke supporting body comprising a pair of sheet metal members formed from a blank provided with a central opening adapted to receive a hub, and both members having a continuous integral flange around the outer edge, the said two flanged body members being telescoped together, the said two flanged body members being so related in size that the outer flange on one member may be telescoped within and closely fitting under the corresponding flange on the opposite member, the said outer flanges being in width substantially the same as the distance spaced between the main pair of supporting members, be formed at right angles to their integral member, directed toward opposite members when assembled, and thus provide a double thickness of metal spacing the two members and following continuously around the outer margin of the telescoped body.

9. In a wheel having between the hub and rim elements a supporting element formed from a sheet metal blank, as a means of reinforcing such support member, the provision of a continuous flange around and integral with the main body substantially at right angles thereto and at a circumferential series of points carrying such flange hubwardly substantially one half of the radial depth of the body, said flange being of an undulating form and having curved corners at all points of change of direction progressively around the body.

10. In a wheel having between the hub and the annular rim elements a supporting element formed from a pair of sheet metal blanks not integral but made separately from the rim and hub members, of a lighter gauge metal, and thereafter operatively positioned in the wheel structure, said supporting element having a corresponding circumferential series of peripheral open portions removed from the otherwise disc form of the two metal blank bodies, leaving a series of sheet metal spoke plate portions remaining, as a means of reinforcing said supporting element a flange at each of said series of open portions formed integrally with each plate body by so providing such open portions that the metal of the blank is not severed at the spoke plate sides or portions of the wall between adjoining spokes but is there formed over as an integral flange around the margin of said open portions extending at right angles to the main sheet body, and the said flanges on the two said metal bodies being relatively so formed with respect to size that the flanges of the two bodies may be and are telescoped together the full depth and length of said flanges, substantially as set forth.

11. In a wheel having a spoke supporting element comprised of a pair of metal plate members provided with a central opening and mounted in spaced parallel relation on a suitable hub, means for reinforcing said body centrally thereof and maintaining the spaced relation of the two parallel plate members comprising a spacing collar band positioned between the two plate members and encircling the central opening, having flanges at each end extending outwardly in close parallel contact with the plate members, and a further tube or ferrule within the central opening and having ends which extend beyond the outside of both said main plate members, said extended ends being adapted to be suitably formed over the central opening edges on the opposite outer sides of the body.

12. In a wheel of the character described, the combination with the series of spokes, of a rim element comprising a pair of parallel bands having on each an integral inwardly extended flange overhanging the spoke sides and also on the inner edge of each band inwardly directed flanges shaped to conform to the spoke ends bridging across from one spoke to the next, the cut out of these latter flanges being adapted to permit the respective main rim bands to be pressed into position over the spoke ends from opposite sides of the spokes, bringing the said inner flanges in contact with each other and with the outer edge flanges overhanging the spoke sides, and means for securing the two said rim members together and clamping the spoke ends therebetween, substantially as set forth.

In testimony whereof, I have hereunto signed my name to this specification.

GERALD G. BARRY.

CERTIFICATE OF CORRECTION.

Patent No. 1,422.167. July 11, 1922.

GERALD G. BARRY.

It is hereby certified that error appears in the printed specification of the above numbered patent requiring correction as follows: Page 5, line 107, claim 9, for the words "substantially one half" read a part; and that the said Letters Patent should be read with this correction therein that the same may conform to the record of the case in the Patent Office.

Signed and sealed this 7th day of June, A. D. 1938.

(Seal)

Henry Van Arsdale,
Acting Commissioner of Patents.